(12) United States Patent
Shimizu

(10) Patent No.: US 10,813,431 B2
(45) Date of Patent: Oct. 27, 2020

(54) DRAWING DEVICE, DRAWING METHOD AND STORAGE MEDIUM

(71) Applicant: CASIO COMPUTER CO., LTD., Shibuya-ku, Tokyo (JP)

(72) Inventor: Daisuke Shimizu, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/712,913

(22) Filed: Dec. 12, 2019

(65) Prior Publication Data

US 2020/0113306 A1 Apr. 16, 2020

Related U.S. Application Data

(63) Continuation of application No. 16/140,018, filed on Sep. 24, 2018, now Pat. No. 10,702,039.

(30) Foreign Application Priority Data

Sep. 27, 2017 (JP) ................. 2017-185570

(51) Int. Cl.
| | |
|---|---|
| *A45D 29/14* | (2006.01) |
| *A45D 29/22* | (2006.01) |
| *G06K 9/46* | (2006.01) |
| *G05B 19/04* | (2006.01) |
| *A45D 29/00* | (2006.01) |
| *B41J 2/165* | (2006.01) |

(52) U.S. Cl.
CPC ............. *A45D 29/14* (2013.01); *A45D 29/00* (2013.01); *A45D 29/22* (2013.01);
(Continued)

(58) Field of Classification Search
CPC .. A45D 29/14; A45D 29/22; A45D 2029/005; A45D 29/00; G05B 19/041;
(Continued)

(56) References Cited

U.S. PATENT DOCUMENTS

| | | | |
|---|---|---|---|
| 6,880,913 B2 | 4/2005 | Suzuki | |
| 9,399,343 B2 * | 7/2016 | Kuroda | ............... B41J 2/16508 |

(Continued)

FOREIGN PATENT DOCUMENTS

| | | |
|---|---|---|
| JP | 2000289229 A | 10/2000 |
| JP | 2004017542 A | 1/2004 |

(Continued)

OTHER PUBLICATIONS

Japanese Office Action (and English language translation thereof) dated Mar. 17, 2020 issued in Japanese Application No. 2017-185570.

*Primary Examiner* — Neil R McLean
(74) *Attorney, Agent, or Firm* — Holtz, Holtz & Volek PC

(57) ABSTRACT

A drawing device, including: a drawing head which performs drawing on a drawing target; a head mover which moves the drawing head in a first direction and in a second direction which intersects with the first direction; a cap which protects the drawing head; and a processor which controls the drawing head and the head mover. Within a range where the drawing head is moved by the head mover, a drawing area where the drawing target is placed and the drawing by the drawing head is performed and a stand-by area where the cap is disposed are provided. The drawing head performs the drawing on the drawing target while the processor controls the head mover to move the drawing head in the first direction. The drawing head is protected with the cap by the processor controlling the head mover to move the drawing head to the stand-by area.

13 Claims, 9 Drawing Sheets

(52) U.S. Cl.
CPC ....... *B41J 2/16517* (2013.01); *B41J 2/16538* (2013.01); *G05B 19/041* (2013.01); *G06K 9/4604* (2013.01); *A45D 2029/005* (2013.01); *B41J 2002/16573* (2013.01)

(58) Field of Classification Search
CPC . G06K 9/4604; B41J 2/16538; B41J 2/16517; B41J 2002/16573; B41J 3/445; B41J 3/4073; B41J 3/36; B41J 2/1652; B41P 2217/50

See application file for complete search history.

(56) References Cited

U.S. PATENT DOCUMENTS

| | | | |
|---|---|---|---|
| 2009/0051732 A1* | 2/2009 | Kato | B41J 2/16538 347/33 |
| 2009/0085969 A1 | 4/2009 | Kato et al. | |
| 2012/0249672 A1* | 10/2012 | Inoue | B41J 2/16508 347/32 |
| 2015/0374092 A1 | 12/2015 | Bitoh | |
| 2016/0031222 A1* | 2/2016 | Kobayashi | B41J 2/16523 347/28 |
| 2016/0355022 A1 | 12/2016 | Kuribayashi | |
| 2017/0341438 A1 | 11/2017 | Nishiyama et al. | |

FOREIGN PATENT DOCUMENTS

| | | |
|---|---|---|
| JP | 2007021726 A | 2/2007 |
| JP | 2008265350 A | 11/2008 |
| WO | 2017030135 A1 | 2/2017 |

\* cited by examiner

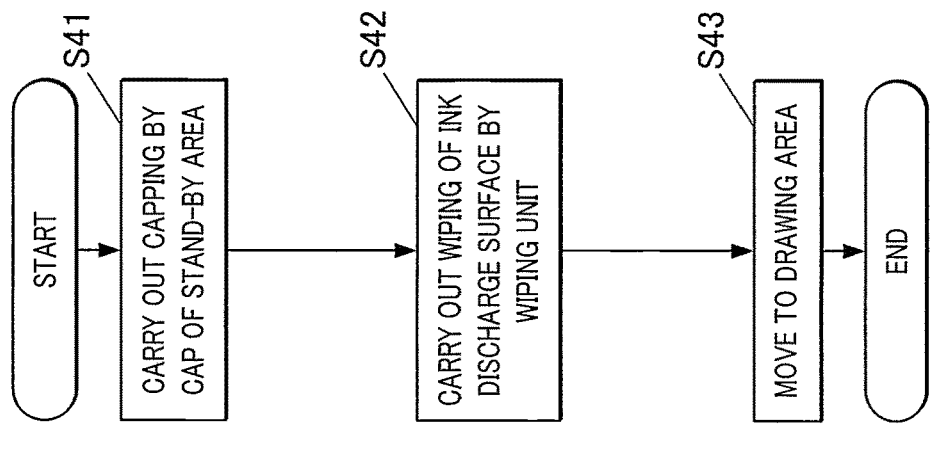
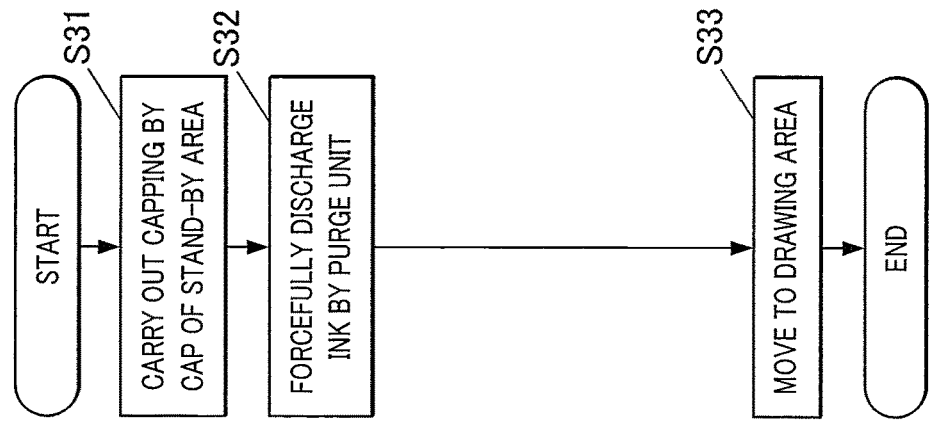
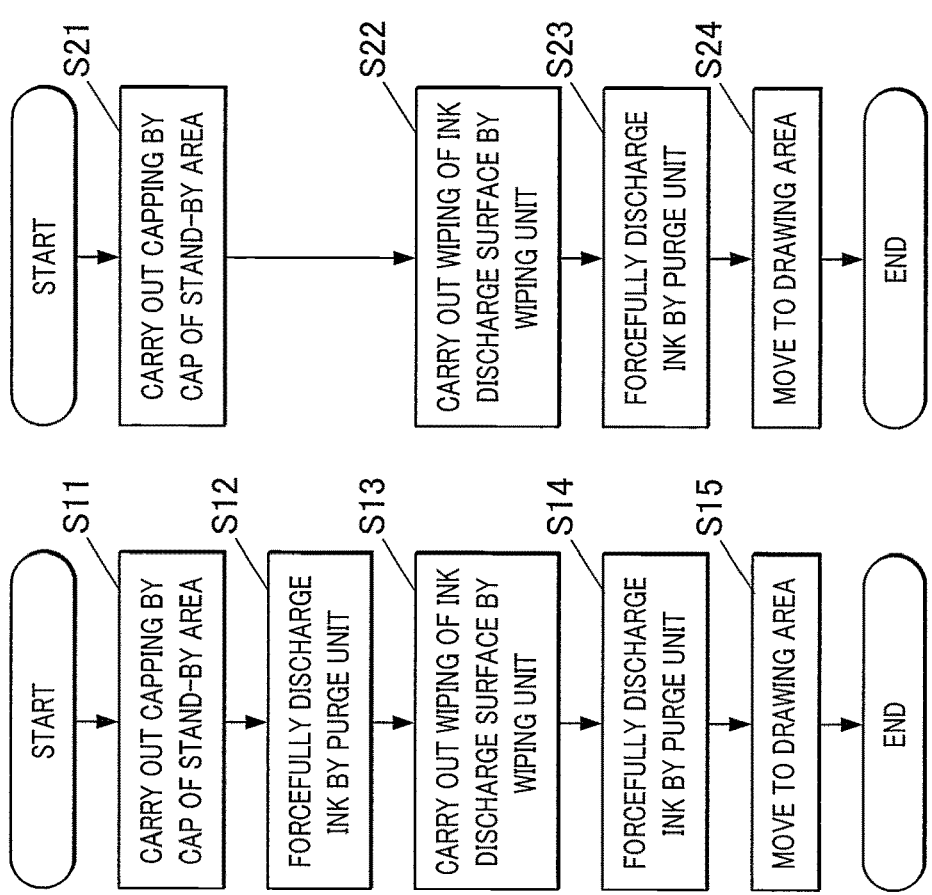

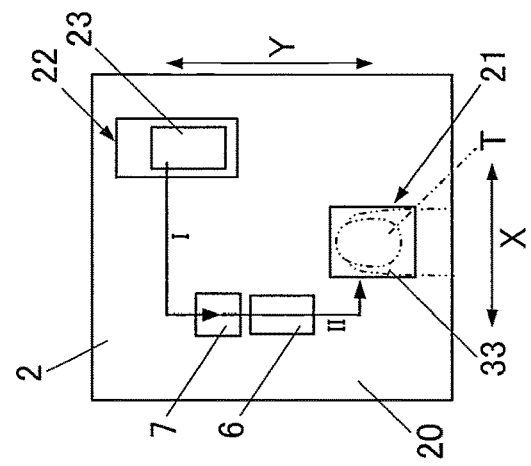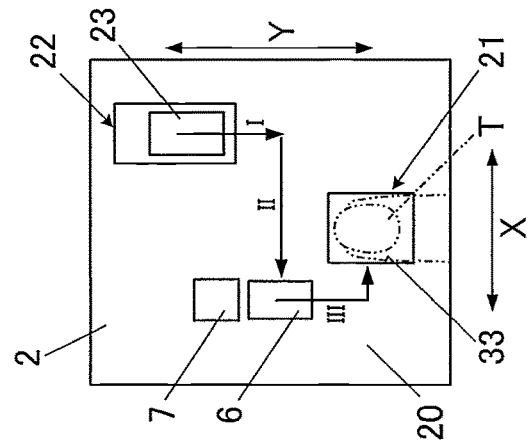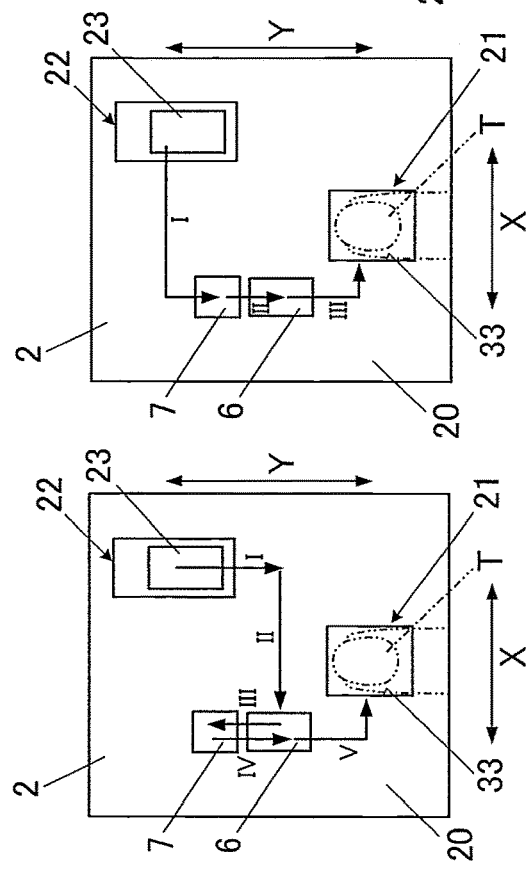

DRAWING DEVICE, DRAWING METHOD AND STORAGE MEDIUM

CROSS-REFERENCE TO RELATED APPLICATIONS

This application is a Continuation Application of U.S. application Ser. No. 16/140,018, filed Sep. 24, 2018, which is based upon and claims the benefit of priority under 35 USC 119 of Japanese Patent Application No. 2017-185570 filed on Sep. 27, 2017, the contents of both of which, including the description, claims, drawings, and abstract, are incorporated herein by reference in their entirety.

BACKGROUND OF THE INVENTION

1. Field of the Invention

The present invention relates to a drawing device, a drawing method and a storage medium.

2. Description of Related Art

Traditionally, there is known an inkjet type drawing device which draws a design on a drawing target by discharging ink from an ink discharge surface, the ink being in the form of fine ink droplets.

In such case of inkjet type drawing device, while using the device, there is a possibility that ink attaches on the ink discharge surface of the drawing head, inside the nozzles and the like whose discharge outlets are formed on the ink discharge surface and air bubbles and foreign matters enter the nozzles and cause clogging thereof. Further, in the case where the drawing operation has not been executed for a long period of time, there is a possibility that the ink inside the nozzles dry up and becomes hard to be discharged and the ink and the like attached on the ink discharging surface gets hard and covers the ink discharge outlets.

If the drawing operation is made to continue while leaving the above problems unsolved, this will cause ink discharge malfunction such as that the discharging direction of ink may be in a different direction and the ink cannot land at the correct positions and that the ink cannot be discharged from the ink discharge outlets and the like. Therefore, it will be difficult to perform a high-definition drawing.

Therefore, the inkjet type drawing device is known for performing maintenance as needed such as by performing a purge process where ink is forcefully discharged from the ink discharge surface to wash out, by the ink, air bubbles, foreign matters and the like which are attached inside the nozzles and on the ink discharge outlets or entered the nozzles to solve the ink discharge malfunction, and wiping off the ink attached to the nozzle surface with a wiping member (for example, see JP 2007-021726).

However, with respect to a commonly used inkjet type drawing device, drawing is performed on a drawing target such as a sheet of paper while conveying the drawing target in a predetermined conveyance direction. Therefore, the drawing head is formed in a uniaxial structure where it only moves in the direction (for example, the X direction) orthogonal to the conveyance direction of the drawing target (for example, the Y direction).

Therefore, as described in JP 2007-021726, it was necessary to line up the drawing area to which drawing is to be performed, the stand-by area where the drawing head is on stand-by when drawing is not to be performed and the area where maintenance is to be performed, in a parallel manner along the moving direction of the drawing head.

Thus, the order in which maintenance is to be performed is fixed in the case where the maintenance operation is to be performed between the stand-by area and the drawing area, and it has been difficult to adjust the content of the maintenance according to the circumstances.

Further, the arrangement of the stand-by area and the maintenance area is limited, and it is difficult to assure the efficient line of flow.

SUMMARY OF THE INVENTION

The present invention has been made in view of the above problems and an advantage of the present invention is to provide a drawing device, a drawing method and a program which can efficiently perform the maintenance of the drawing head by performing the maintenance operations in combinations as needed according to the circumstances.

According to as aspect of the present invention, there is provided a drawing device, including: a drawing head which performs drawing on a drawing target; a head moving unit which moves the drawing head in a first direction and in a second direction which intersects with the first direction; a processor which controls the drawing head and the head moving unit; and a plurality of maintenance units in which the drawing head performs maintenance with contents different from each other, wherein within a range where the drawing head is moved by the head moving unit, a drawing area where the drawing target is placed and the drawing by the drawing head is performed, a stand-by area where the drawing head is disposed during a non-drawing time when the drawing head does not perform the drawing and the plurality of maintenance units are provided at positions different from each other, the processor controls the head moving unit to control whether the maintenance is performed or not in at least one of the plurality of maintenance units when the drawing head moves between the stand-by area and the drawing area.

According to another aspect of the present invention, there is provided a drawing method of a drawing device, the drawing device including a drawing head which performs drawing and a plurality of maintenance units, wherein in the plurality of maintenance units, the drawing head performs maintenance with contents that are different from each other, and within a range where the drawing head is moved, a drawing area where the drawing target is placed and the drawing by the drawing head is performed, a stand-by area where the drawing head is disposed during a non-drawing time when the drawing head does not perform the drawing and the plurality of maintenance units are provided at positions different from each other, the method including: moving the drawing head in a first direction and in a second direction between the drawing area, the stand-by area and the plurality of maintenance units; and controlling whether the maintenance is performed or not in at least one of the plurality of the maintenance units by moving the drawing head in the first direction and in the second direction when the drawing head is moved between the stand-by area and the drawing area.

According to another aspect of the present invention, there is provided a non-transitory storage medium storing a program for causing a computer which controls a drawing device to perform processes, the drawing device including a drawing head which is moved in a first direction and in a second direction that intersects with the first direction and which discharges ink on a drawing target to perform drawing on the drawing target, and a plurality of maintenance units, wherein in the plurality of maintenance units, the drawing head performs maintenance with contents that are different from each other, and within a range where the drawing head is moved, a drawing area where the drawing target is placed and the drawing by the drawing head is performed, a stand-by area where the drawing head is disposed during a non-drawing time when the drawing head does not perform the drawing and the plurality of maintenance units are provided at positions different from each other, the processes including: moving the drawing head in the first direction and in the second direction between the drawing area, the stand-by area and the plurality of maintenance units; and controlling whether the maintenance is performed or not in at least one of the plurality of the maintenance units by moving the drawing head in the first direction and in the second direction when the drawing head is moved between the stand-by area and the drawing area.

BRIEF DESCRIPTION OF THE DRAWINGS

The above and other objects, advantages and features of the present invention will become more fully understood from the detailed description given hereinbelow and the appended drawings with are given by way of illustration only, and thus are not intended as a definition of the limits of the present invention, and wherein:

FIG. 13A is a flowchart showing the maintenance process of the first maintenance mode;

FIG. 13B is a flowchart showing the maintenance process of the second maintenance mode;

FIG. 13C is a flowchart showing the maintenance process of the third maintenance mode;

FIG. 13D is a flowchart showing the maintenance process of the fourth maintenance mode;

FIG. 14A is an explanatory view showing the maintenance process of the first maintenance mode;

FIG. 14B is an explanatory view showing the maintenance process of the second maintenance mode;

FIG. 14C is an explanatory view showing the maintenance process of the third maintenance mode; and FIG. 14D is an explanatory view showing the maintenance process of the fourth maintenance mode.

DESCRIPTION OF THE PREFERRED EMBODIMENTS

Figure 1:
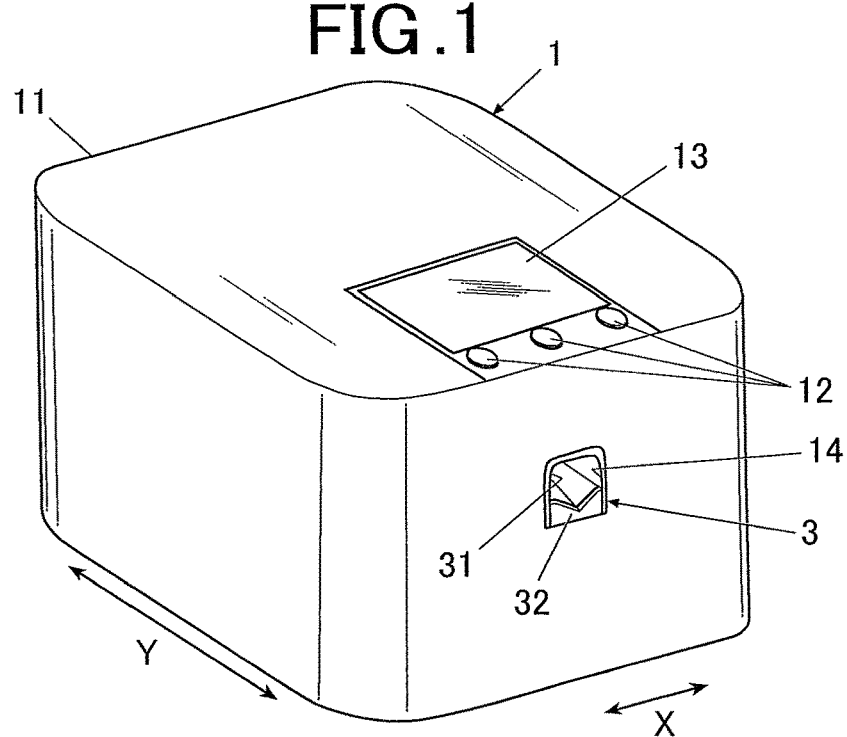
FIG. 1 is a perspective view showing an outer structure of a nail print device according to the embodiment.

An embodiment of the drawing device according to the present invention will be described with reference to FIGS. 1 to 14D.

Here, although various limitations which are technically preferred to perform the present invention are described in the following embodiment, the scope of the present invention is not limited to the embodiment and the examples shown in the drawings.

Further, in the following embodiment, the case of a nail print device where the drawing device draws a design on a drawing target which is a nail of a finger of a hand will be described as an example. However, the drawing target of the drawing device in the embodiment is not limited to a nail of a finger of a hand and for example, a nail of a finger of a foot may also be the drawing target. Further, something other than a nail, such as a nail chip, surfaces of various types of accessories and the like may also be the drawing target.

As shown in FIG. 1, the nail print device 1 according to the embodiment includes a case 11 formed in an approximate box shape.

The operating unit 12 is set on the upper surface (top board) of the case 11.

The operating unit 12 is an input unit where a user performs various types of inputs.

The operating unit 12 includes operating buttons for performing various types of inputs such as a power switch button for turning the power of the nail print device 1 on, a stop switch button for stopping the operation, a design selecting button for selecting a design image which is to be drawn on the nail T, a drawing start button for giving an instruction to start the drawing and the like.

Further, the display 13 is set on the upper surface (top board) of the case 11.

The display 13 is formed of a liquid crystal display (LCD), an organic electroluminessence display, other flat display or the like, for example.

In the embodiment, for example, a nail image (a finger image including the image of the nail T) which is obtained by photographing a finger U1, an image of a contour line or the like of the nail T which is included in the nail image, an image in a state where the after-mentioned original image is projected on the nail T, a design selecting screen for selecting a design image which is to be drawn on the nail T, a thumbnail image for design confirmation, instruction screens which show various types of instructions and the like are to be displayed in the display 13 as needed.

Here, a touch panel for performing various types of inputs may be integrally included in the surface of the display 13. In such case, the touch panel functions as the operating unit 12.

Figure 11:
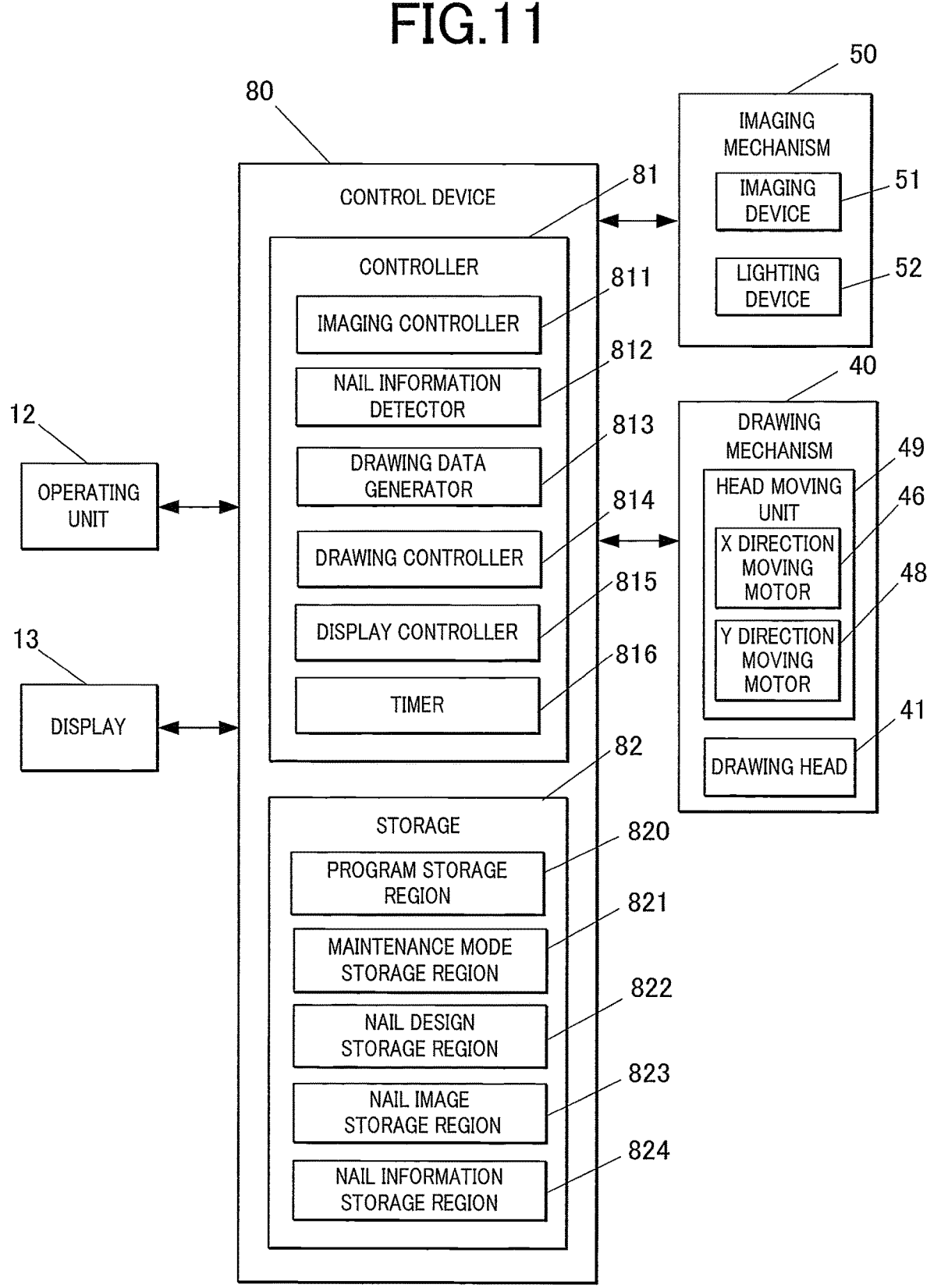
FIG. 11 is a block diagram of a main part showing the controlling configuration of the nail print device according to the embodiment.

Furthermore, at the position above the window 33 of the after-mentioned finger fixation unit 3, inside the upper surface (top board) of the case 11, an imaging mechanism 50 which obtains a nail image (an image of a finger U1 including the nail T) by photographing the nail T which is exposed from this window 33 is provided (see FIG. 11).

Here, with respect to the imaging mechanism 50, it is sufficient that the nail T which is placed inside the finger fixation unit 3 can be photographed and its specific arrangement is not limited. For example, the imaging mechanism 50 may be fixed to any one of structure bodies disposed inside the case 11 or may be fixed to a carriage or the like of the after-mentioned drawing mechanism 40, instead of being fixed to the inner surface of the case 11, to be made to move by a head moving mechanism 49 (see FIG. 11). In such case, the imaging mechanism 50 can be made to move in the X direction and the Y direction by the head moving unit 49 which is structured by the X direction moving motor 46, the Y direction moving motor 48, and the like.

In such way, if the imaging mechanism 50 is configured so as to be made to move by the head moving unit 49 or the like, the imaging mechanism 50 and the drawing head 41 are to be made to move as needed so that the imaging mechanism 50 be arranged above the nail T which is exposed through the window 33 of the finger fixation unit 3 when the nail T which is the drawing target is to be photographed and the drawing head 41 be arranged above the finger fixation unit 3 when a design is to be drawn.

The imaging mechanism 50 is an imaging unit which photographs the nail T to obtain a nail image which is an image of a finger U1 including the nail T.

The imaging mechanism 50 includes an imaging device 51 and a lighting device 52.

The imaging device 51 is a small-sized camera including a solid state image sensor of over two million pixels, a lens and the like, for example.

The lighting device 52 is an illuminating light of white LED or the like, for example. In the embodiment, a plurality of lighting devices 52 is disposed so as to surround the imaging device 51. Here, the number of lighting devices 52 and the arrangement thereof are not limited to the example shown in the drawing.

The imaging mechanism 50 is connected with the imaging controller 811 of the after-mentioned control device 80 and is to be controlled by the imaging controller 811.

Here, the image data of the image which is photographed by the imaging mechanism 50 is to be stored in the after-mentioned nail image storage region 823.

Further, at approximately in the center of the nail print device 1 in the X direction (X direction in FIG. 1) on the front surface side (the front side in FIG. 1) of the case 11, an opening 14 is formed which is for inserting the finger U1 corresponding to the nail T which is the drawing target at the time when the photographing is to be performed by the nail print device 1, and when the drawing operation is to be performed by the drawing mechanism 40 and for setting the nail T at the photographing position where the nail T can be photographed by the imaging mechanism 50 and at the drawing position where a design can be drawn on the nail T by the drawing mechanism 40.

As will be described later, the finger fixation unit 3 which fixates the nail T (the finger U1 including the nail T) is disposed inside the opening 14.

Figure 2:
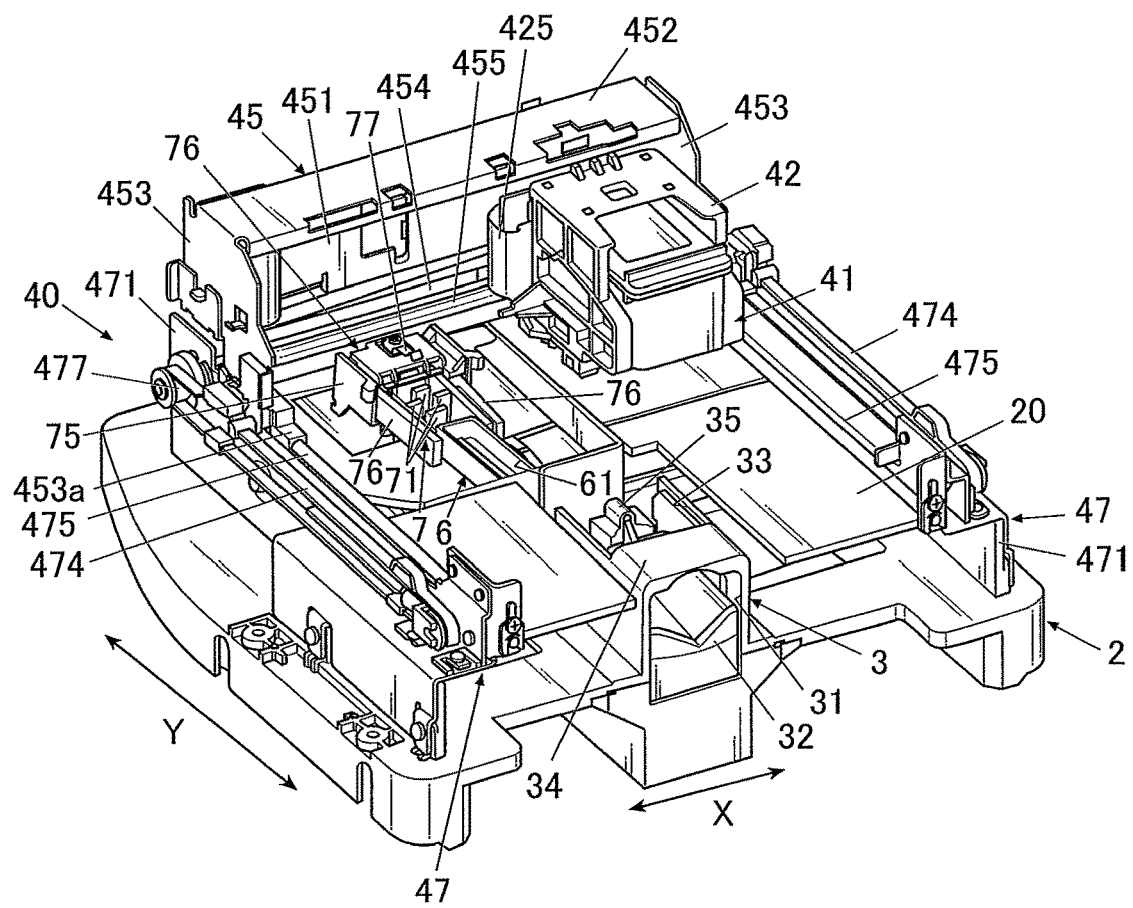
FIG. 2 is a perspective view of a main part showing the inside structure where the case is removed from the nail print device.

FIG. 2 is a perspective view of a main part showing the inside configuration of the nail print device 1 where the case 11 is removed from the nail print device 1 shown in FIG. 1.

As shown in FIG. 2, the platform 2 to which various types of inner structures are mounted is provided inside the case 11.

The surface of the platform 2 (that is, the upper surface of the nail print device 1 as shown in FIG. 2) is the platform upper surface 20 which includes the X-Y plane surface in the embodiment.

At approximately in the center in the width direction of the device (the X direction in FIG. 2) and in the front side of the device of the platform upper surface 20 (the front side in the Y direction in FIG. 2), the finger fixation unit 3 is formed at the position corresponding to the opening 14 of the case 11.

The finger fixation unit 3 is a box-shaped member having an opening 31 formed in the front side of the device, and the finger fixating member 32 which fixates the finger U1 is disposed inside the finger fixation unit 3.

The finger fixating member 32 is for supporting the finger U1 pushing the finger U1 upward from below and for example, it is formed of a resin or the like having flexibility. In the embodiment, the finger fixating member 32 is formed in a shape where approximately in the center thereof in the width direction is concaved and when the finger U1 is placed on the finger fixating member 32, the finger U1 can be prevented from shaking in the width direction of the device (the X direction in FIGS. 1 and 2) due to the ball of the finger U1 being received by the finger fixating member 32.

Here, it is sufficient that the finger fixating member 32 can support the finger U1 from below and its configuration is not limited. For example, the finger fixating member 32 may include an elastic member such as a spring to be biased from below. Further, for example, the finger fixating member 32 may be structured so as to pinch-and-swell by changing the pressure inside thereof to push up the finger U1 in the swelled state and fixate the finger U1 at the position.

The back part of the top surface of the finger fixation unit 3 has a window 33 that opens. From this window 33, the nail T of the finger U1 which is inserted in the finger fixation unit 3 is to be exposed.

In the embodiment, the area where the window 33 is formed is the drawing area 21 (see FIG. 3) where drawing is to be performed by the after-mentioned drawing mechanism.

Although the position where the window 33 is formed in the finger fixation unit 3 (that is, the position of the drawing area 21) is not limited to the position exemplified in the drawing, the drawing area 21 is provided in the platform upper surface 20 which is the X-Y plane surface within the range where the drawing head 41 can be made to move by the head moving unit 49 (see FIG. 11, will be described later).

Further, the front side of the top surface of the finger fixation unit 3 is a finger holder 34 which prevents the finger U1 from raising upward and regulates the position of the finger U1 in the upper direction. The height position of the finger U1 and the nail T thereof is decided to a predetermined position by being supported by the finger fixating member 32 from below and by the upper side of the finger U1 being held down by the finger holder 34.

Further, in the embodiment, the nail placing unit 35 on which the nail T is to be placed is formed in the back in the finger inserting direction.

By placing the tip of the nail T on the nail placing unit 35, the position of the nail T in the horizontal direction (that is, in the X direction and in the Y direction) is decided and the position of the nail T in the height direction is also decided.

Further, as shown in FIG. 2, the drawing mechanism 40 which draws a design on the drawing target surface is provided inside the case 11. Here, the drawing target surface is the surface of the drawing target and in the embodiment, it is the surface of the nail T of the finger U1.

The drawing mechanism 40 includes a drawing head 41 which is the drawing mechanism main body, a head carriage 42 which holds the drawing head 41, an X direction moving stage 45 for moving the drawing head 41 in the X direction (the X direction in FIGS. 1 and 2 and the like, the left-right direction in the nail print device 1), an X direction moving motor 46 (see FIG. 11), a Y direction moving stage 47 for moving the drawing head 41 in the Y direction (the Y direction in FIGS. 1 and 2 and the like, the front-back direction in the nail print device 1), the Y direction moving motor 48 (see FIG. 11) and the like.

The Y direction moving stage 47 includes holding members 471 which are provided so as to extend in the Y direction (the Y direction in FIGS. 1 and 2 and the like, the front-back direction in the nail print device 1) on both sides of the platform upper surface 20 in the width direction of the device (the X direction in FIGS. 1 and 2 and the like, the left-right direction in the nail print device 1), respectively.

Pulleys 477 are attached at both sides in the extending direction of each of the holding members 471 forming the pair. Drive belts 474 which extend in the front-back direction of the device (the Y direction in FIG. 2 and the like) are respectively wound around the pulleys 477 on the left side of the device and on the right side of the device.

The pulleys 477 provided in the back of the device are respectively attached on both sides of the drive shaft 476. The Y direction moving motor 48 (see FIG. 11) is connected to this drive shaft 476, and the drive shaft 476 and the pulleys 477 attached to the drive shaft 476 rotate in the forward and reverse directions as needed by the driving of the Y direction moving motor 48.

By the rotation of the pulleys 477, the drive belts 474 which are wound around the pulleys 477 also rotate and thereby, the X direction moving stage 45 (and the drawing head 41 mounted on the X direction moving stage 45) can move in the Y direction.

Further, guide shafts 475 which extend in the Y direction in parallel with the drive belts 474 are respectively provided on the holding members 471.

The X direction moving stage 45 includes a back plate 451 which extends in the X direction of the platform 2 and which is provided so as to stand with respect to the platform upper surface 20 in the back of the device, a shield 452 which extends outward in the front of the device from the upper end section of the back plate 451, and sides units 453 forming a pair which are provided so as to stand and so as to respectively cover both sides of the approximately L-shaped unit, when seen from a side, formed of the back plate 451 and the shield 452.

The side units 453 forming the left and right pair respectively include shaft inserting units 453a in which guide shafts 475 are respectively inserted. Further, by the guide shafts 475 being respectively inserted in the shaft inserting units 453a forming a pair and the Y direction drive motor 48 being driven to rotate the drive belts 474, the X direction moving stage 45 can move in the Y direction along the guide shafts 475.

Further, pulleys (not shown) to which the X direction moving motor 46 is connected is provided inside the pair of side units 453. The drive belt 454 which extends in the left and right direction of the device (the X direction in FIG. 2) is wound around the pulleys. Further, the guide shaft 455 which extends in the X direction of the platform 2 being approximately parallel with the drive belt 454 is provided inside the X direction moving stage 45.

The head carriage 42 which holds the drawing head 41 is mounted on the X direction moving stage 45.

In the back surface side (in the back side of the device) of the head carriage 42, the carriage holding member 421 in which the shaft inserting unit 422 (see FIG. 8) in which the guide shaft 455 is to be inserted is formed is provided.

By the guide shaft 455 being inserted in the shaft inserting unit 422 of the head carriage 42 and by the X direction drive motor 46 being driven to rotate the drive belt 454, the head carriage 42 can move inside the X direction moving stage 45 in the X direction along the guide shaft 455.

In the embodiment, the head moving unit 49 (see FIG. 11) which can move the drawing head 41 in the X direction and in the Y direction on the X-Y plane surface is formed by including the X direction moving motor 46, the Y direction moving motor 48 and the like, and the operation thereof is controlled by the after-mentioned control device 80 (especially, the processor 814).

Here, it is not necessary that every part of the processor 814 which controls the operation of the drawing head 41 and the operation of the head moving unit 49 is provided on one control board. For example, the controller 81 which controls the ink discharging of the drawing head 41, the operation of the X direction moving motor 46 and the like may be mounted, and a control board (not shown) which is electrically connected to the main control board may be provided in the X direction moving stage 45. In the embodiment, a flexible printed circuit board 425 is provided in the back surface side of the head carriage 42. This printed circuit board 425 is electrically connected with the control board provided in the X direction moving stage 45, and the control signal from the processor 814 which is provided on the main control board is sent to the printed circuit board 425 via the control board which is provided in the X direction moving stage 45 to perform ink discharge control and the like of the drawing head 41 in accordance with the controlling of the processor 814.

The drawing head 41 of the embodiment is an inkjet head which performs the inkjet style drawing.

The drawing head 41 is an ink-cartridge integrated type head where the ink cartridges (not shown) respectively corresponding to yellow ink (Y; YELLOW), magenta ink (M; MAZENTA) and cyan ink (C; CYAN) and the ink discharge surfaces 411 provided on the surface (in the embodiment, the under surface in FIG. 4 and the like) which faces the drawing target (the surface of the nail T) of each ink cartridge are integrally formed. On the ink discharge surface 411, discharge outlets (ink discharge outlets, not shown) of nozzle array including a plurality of nozzles which spray the inks of individual colors are formed in a line. The drawing head 41 transforms the ink into fine droplets and performs drawing by directly spraying the ink onto the drawing target surface of the drawing target (that is, the surface of the nail T) from the ink discharge surface 411 (ink discharge outlets of the ink discharge surface 411). Here, the drawing head 41 is not limited to a head which can discharge inks of the above-mentioned three colors. The drawing head 41 may include an ink cartridge for pooling another ink and the ink discharge outlet thereof.

Figure 3:
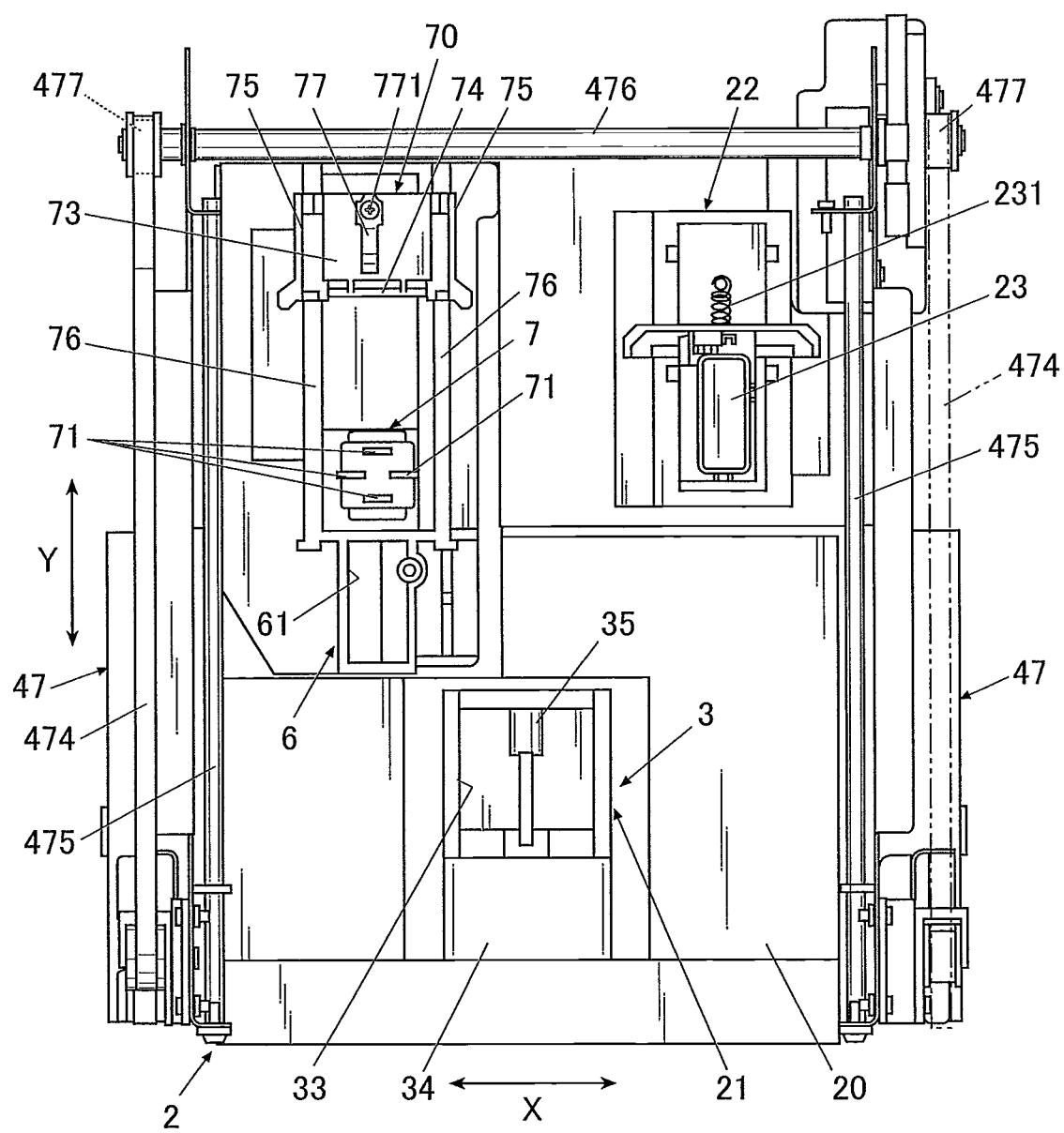
FIG. 3 is a plan view showing a configuration of a platform of the nail print device according to the embodiment.

FIG. 3 is a plan view showing the configuration of the platform upper surface 20 where the X direction moving stage 45 of the drawing mechanism 40 and the drawing head 41 which is held by the head carriage 42 are removed.

As shown in FIGS. 2 and 3, in the front side in the Y direction and at approximately in the center of the X direction of the platform upper surface 20, the finger fixation unit 3 is disposed as described above. In the embodiment, the area corresponding to the window 33 of the finger fixation unit 3 is the drawing area 21 where the drawing head 41 performs the drawing operation at the time of drawing.

Further, the area which is in the back side in the Y direction and on the right side in the X direction of the platform upper surface 20 thereof (the right side in FIGS. 2 and 3) is the stand-by area 22 where the drawing head 41 is disposed at the time when drawing does not take place.

The stand-by area 22 is arranged at a position which is different from a position of the drawing area 21. Here, it is sufficient that the stand-by area 22 is arranged on the X-Y plane and within the range where the drawing head 41 can be made to move by the head moving unit 49, and the position is not limited to the example shown in the drawings.

The cap 23 which covers the ink discharge surface 411 is provided in the stand-by area 22.

The cap 23 is for protecting the ink discharge surface 411 from drying or the like when drawing does not take place and for example, is made of a flexible resin or the like.

When it is disposed at the initial position where it does not cover the drawing head 41 (in the state shown in FIG. 3, for example), the cap 23 is biased toward the front side in the Y direction (downward in FIG. 3) by the biasing member 231 having a spring and the like. In this state, the upper surface of the cap 23 is lowered to a sufficiently low position to the extent where the cap 23 does not come in contact with the under surface of the drawing head 41 (that is, the ink discharge surface 411). In such way, the cap 23 does not come in contact with the drawing head 41 and does not interfere with the moving of the drawing head 41 at the time when drawing takes place.

Furthermore, when the drawing head 41 moves toward the stand-by area 22 while moving toward the back from the front in the Y direction, the drawing head 41 and the head carriage 42 which holds the drawing head 41 go against the bias force of the biasing member 231 and push the cap 23 toward the back in the Y direction.

In such way, the cap 23 raises to the position where it covers the ink discharge surface 411 of the drawing head 41 by being guided by a rail or the like (not shown) and the ink discharge surface 411 is to be capped by the cap 23. Moreover, when the drawing head 41 leaves from the stand-by area 22, the cap 23 is pushed back to the initial position by the biasing member 231 and it is lowered to the height position where it does not interfere with the drawing head 41 again.

Here, the configuration where the cap 23 is vertically moveable between the height position where it does not interfere with the drawing head 41 and the height position where it covers the ink discharge surface 411 of the drawing head 41 is not limited to the example shown here.

Further, as shown in FIGS. 2 and 3, a plurality of maintenance units which perform the maintenance of the drawing head 41 are provided in the back of the platform upper surface 20 in the Y direction and on the left side in the X direction thereof (in the left side in FIGS. 2 and 3).

In the embodiment, the plurality of maintenance units performs maintenances of different contents from each other. In particular, the purge unit 6 which performs the purge process and the wiping unit 7 which wipes the ink discharge surface 411 are provided.

The plurality of maintenance units (in the embodiment, the purge unit 6 and the wiping unit 7) are disposed at positions which are different from the drawing area 21 and the stand-by area 22 on the X-Y plane surface and within the range where the drawing head 41 can be made to move by the head moving unit 49.

Further, the plurality of maintenance units (the purge unit 6 and the wiping unit 7) are disposed at positions which are different from each other at least in one of the X direction and the Y direction. In the embodiment, the purge unit 6 and the wiping unit 7 are disposed at almost same position in the X direction, the purge unit 6 being disposed more in the front side than the wiping unit 7 in the Y direction (in the lower side in FIG. 3).

Here, the specific arrangements of the purge unit 6 and the wiping unit 7 are not limited to the example shown in the drawings and for example, the position of the purge unit 6 and the position of the wiping unit 7 in the Y direction may be the opposite, the purge unit 6 and the wiping unit 7 may be at positions which are different from each other in the X direction and not in the Y direction or they may be at positions which are different from each other both in the X direction and in the Y direction.

The purge unit 6 is a maintenance unit which receives the ink which is forcefully discharged from the ink discharge surface 411 at the time of so-called purge process where the ink is forcefully discharged from the ink discharge outlets of the ink discharge surface 411 to discharge the air, impurities, ink of high viscosity and the like in the ink flow channels of the nozzles and the like outside with the ink.

By performing the purge process, the clogging that occurred in the nozzles of the drawing head 41 is resolved and the ink can regain its good discharge state.

Figure 4:
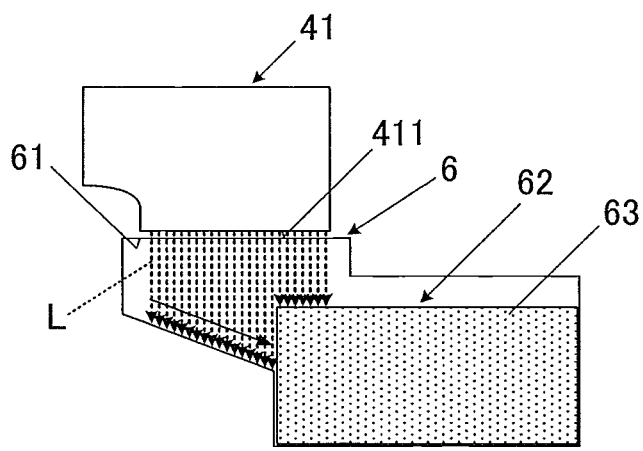
FIG. 4 is a side view schematically showing a configuration of a purge unit according to the embodiment.

FIG. 4 is a schematic side view showing how the maintenance of the drawing head is performed by the purge unit. In FIG. 4, for the convenience of explanation, the purge unit 6 is shown transparent. Further, the ink droplets L which are discharged by the purge process are shown in dotted lines in FIG. 4.

As shown in FIG. 4, the purge unit 6 includes the opening 61 which is formed somewhat larger than the ink discharge surface 411 and the waste ink tank 62 which is formed in continuation with the opening 61. Further, the absorbing body 63 which absorbs the ink is provided inside the waste ink tank 62. It is sufficient that the absorbing body 63 can quickly absorb the ink, and felt which is a porous material, a sponge type resin and the like can be applied, for example.

In the embodiment, an inclined surface is formed toward the waste ink tank 62 from the opening 61, and the ink which is discharged from the ink discharge surface 411 of the drawing head 41 is to flow into the waste ink tank 62 along the inclined surface as shown by the black arrow in FIG. 4.

Here, the absorbing body 63 or the entire purge unit 6 may be a part which can be taken out and replaced.

The wiping unit 7 is a maintenance unit which cleans the ink discharge surface 411 by wiping. As shown in FIGS. 2 and 3, a plurality of wiping members 71 are disposed so as to stand in the wiping unit 7. In the embodiment, four wiping members are disposed in a zigzag pattern so as to be in different positions from each other. Here, the arrangement of the wiping members 71, the size and the number thereof and the like are not limited to those in the example shown in the drawings.

For example, if the wiping member 71 is wider than the width of the ink discharge surface 411 (the width size in the X direction in FIG. 3 and the like) and is able to wipe the entire ink discharge surface 411, there may be only one wiping member 71. Further, greater number of wiping members 71 may be arranged in a plurality of lines.

The wiping members 71 are cleaning blades which wipe off the ink and the like attached to the ink discharge surface 411 and for example, are made of an elastic body such as rubber or the like. It is preferred that the wiping members 71 are made of a corrosive-resistant material which do not easily corrode even if they repeatedly come in contact with ink.

Here, each wiping member 71 or the entire wiping member 7 may be a part which can be taken out and replaced.

Figure 5A:
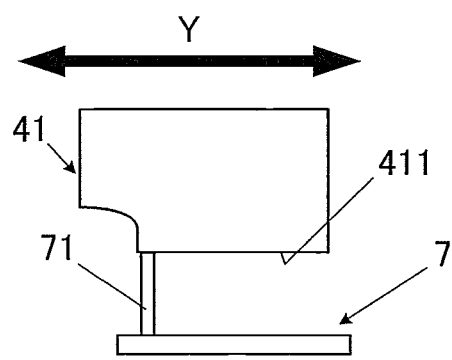
FIGS. 5A to 5C are schematic side views which are used to describe the operation of a wiping unit.
Figure 5B:
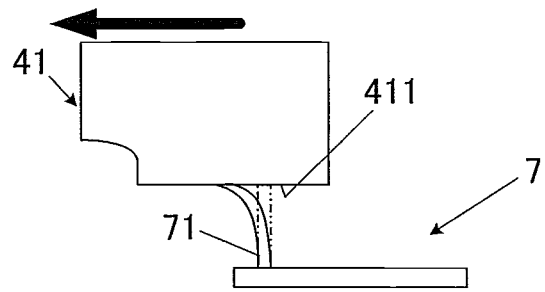
Figure 5C:
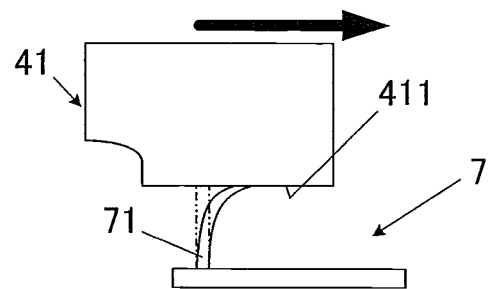

FIGS. 5A to 5C are schematic side views showing how the ink discharge surface of the drawing head is wiped by the wiping members of the wiping unit.

As shown in FIGS. 5A to 5C, if the moving direction of the drawing head is in the Y direction, the wiping members 71 are plate-like members which extend in the X direction orthogonal to the moving direction. Each of the wiping members 71 is formed at the position and height where the tip thereof come in contact with the ink discharge surface 411 when the drawing head 41 moves above the wiping unit 7.

As described above, the wiping members 71 are elastic members. As shown in FIGS. 5B and 5C, the wiping members 71 deform in a flexible manner with the moving of the drawing head 41 and the wiping members 71 can remove the ink and the like attached to the ink discharge surface 411 by sliding the tip sections thereof against the ink discharge surface 411.

Here, when the ink discharge surface 411 of the drawing head 41 is wiped, the ink is attached to the tip sections and the like of the wiping members 71.

Therefore, in the embodiment, the scraping unit 70 for removing the ink attached to the wiping members 71 is provided in the back in the Y direction (the upper side in FIG. 3) than the wiping unit 7.

Figure 6:
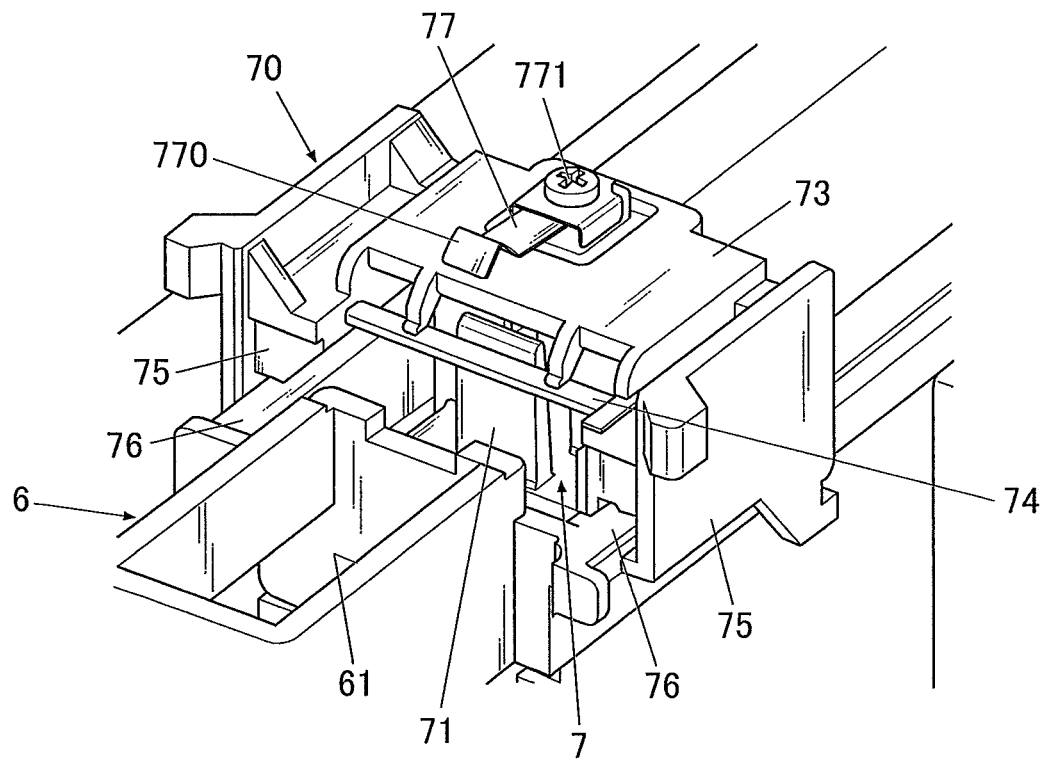
FIG. 6 is a perspective view showing a scraping unit according to the embodiment.
Figure 7:
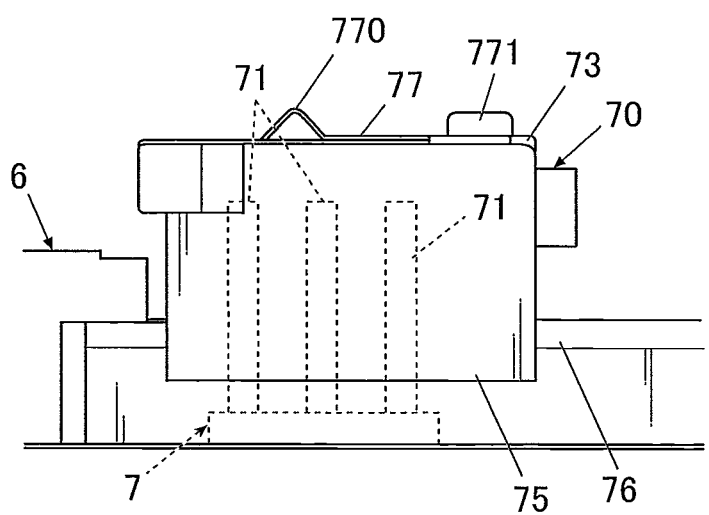
FIG. 7 is a side view of the scraping unit of FIG. 6.

FIG. 6 is a perspective view of a main part of the scraping unit 70. FIG. 7 is a side view of the main part of the scraping unit 70 shown in FIG. 6. In FIG. 7, the part of the wiping unit 7 where overlaps with the scraping unit 70 is shown in dotted lines.

As shown in FIG. 6, the scraping unit 70 includes a scraping main body 73 and guide units 75 which are respectively provided on both sides of the scraping main body 73.

In the front side of the scraping main body 73 (the front side in the Y direction, the lower side in FIG. 3), a scraping member 74 which scrapes off the ink attached to the tip sections and the like of the wiping members 71 by sliding against the wiping members 71 is provided. Here, the material, shape and the like of the scraping member 74 is not specifically limited and the scraping member 74 may be made of any material and in any shape as long as it can remove the ink attached to the wiping members 71.

Guide rails 76 are respectively provided on both sides of the scraping unit 70 along the Y direction.

The guide units 75 which are respectively provided on bode sides of the scraping unit 70 are made to fit with the guide rails 76. The scraping unit 70 can smoothly move in the Y direction by the guide units 75 being guided by the guide rails.

As shown in FIGS. 6, 7 and the like, the top surface of the scraping main body 73 according to the embodiment is provided with a connecting spring 77. The connecting spring 77 is a thin plate spring, for example.

The back end section (the right end section in FIG. 7) of the connecting spring 77 is fixed by a screw 771. Further, the front end section (the left end section in FIG. 7) of the connecting spring 77 is provided with an engaging unit 770 formed by folding a part of the plate spring in the mountain fold manner.

In the embodiment, in order to make the scraping unit 70 slide against the wiping members 71, a method where the scraping unit 70 is made to move by being hooked to the drawing head 41 or the head carriage 42 which holds the drawing head 41 (in the embodiment, the head carriage 42) is adopted.

By having the configuration where the scraping unit 70 is made to move by using the moving of the drawing head 41 or the like as described above, there is no need to have an independent motor or the like for moving the scraping unit 70 and the maintenance of the wiping members 71 can be performed in a simple configuration.

Figure 8:
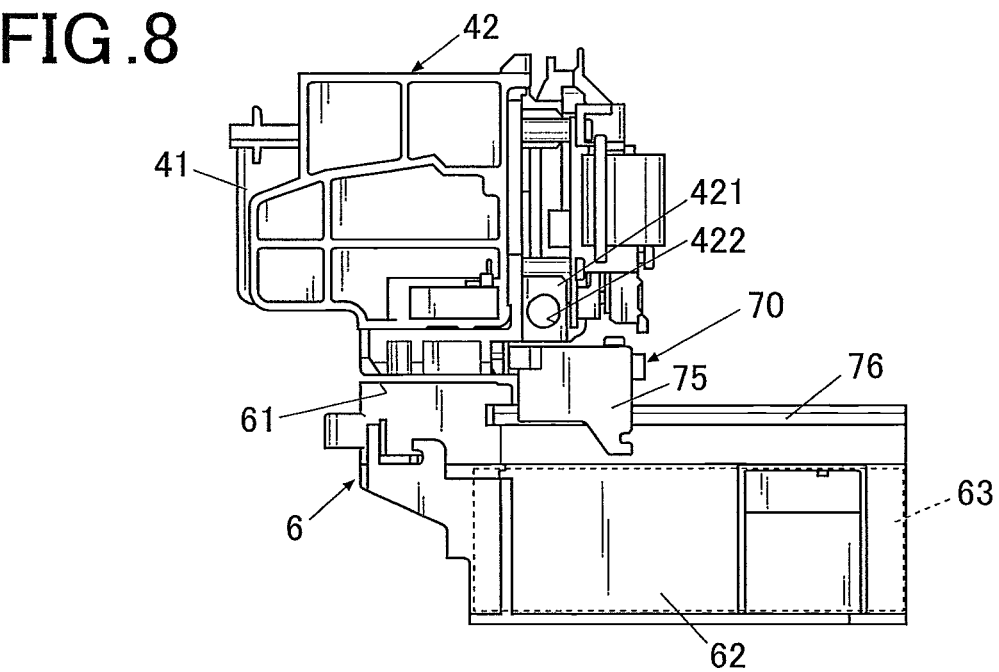
FIG. 8 is a side view showing a state where the drawing head and the scraping unit are joined according to the embodiment.
Figure 9:
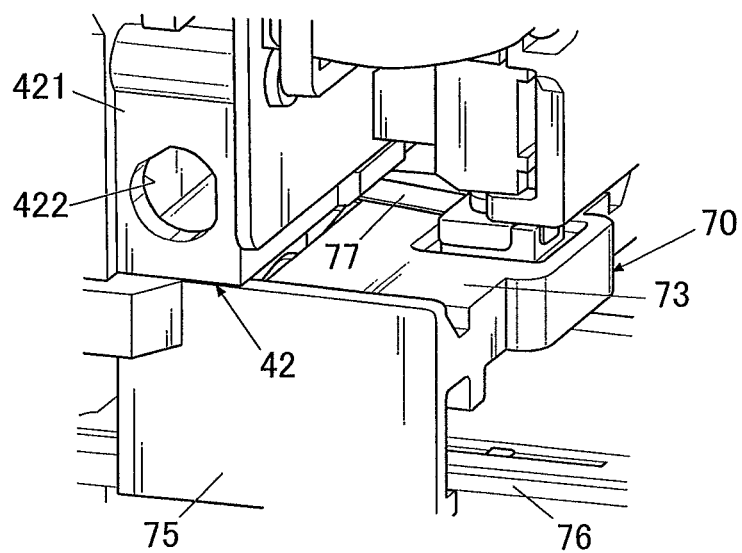
FIG. 9 is a perspective view of a main part where the joint part of the drawing head and the scraping unit is enlarged.
Figure 10:
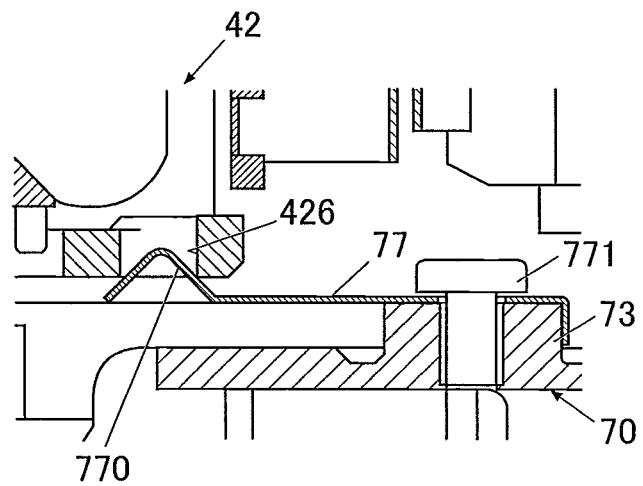
FIG. 10 is a cross-sectional view of a main part where the joint part of the drawing head and the scraping unit is enlarged.

FIG. 8 is a side view showing the state where the scraping unit 70 is moved to the position where it can slide against the wiping members 71 of the wiping unit 7 with the drawing head 41 or the head carriage 42. FIG. 9 is a schematic view of a main part where the joint section of the head carriage and the scraping members as in the state shown in FIG. 8 is enlarged. FIG. 10 is a cross-sectional view of a main part of the section enlarged in FIG. 9.

As shown in FIGS. 9 and 10, in the embodiment, a concave 426 is formed in the under surface of the holding member 421 which is provided in the head carriage 42 and by the engaging unit 770 of the connecting spring 77 fitting in to the concave 426, the scraping unit 70 joins with the head carriage 42.

When joining the scraping unit 70 and the head carriage 42, the head carriage 42 (the drawing head 41 which is held by the head carriage 42) moves to the position above the scraping unit 70 from the back or the front of the scraping unit 70 and further moves in either direction in the Y direction. Since the height of the engaging unit 770 of the connecting spring 77 is higher than the height (space) to the under surface of the head carriage 42, the engaging unit 770 is pressed and made to shrink by being pressed. Further, when the concave 426 comes to the position that corresponds with the engaging unit 770 of the connecting spring 77, the engaging unit 770 in a convex state returns to the original shape due to its spring and as shown in FIG. 10, the engaging unit 77 fits in the concave 426. In such way, the scraping unit 70 joins with the head carriage 42. By the head carriage 42 moving in this joined state, the scraping unit 70 can be made to move to the position where it can scrape the wiping members 71 of the wiping unit 7.

Here, as shown in FIG. 8, the purge unit 6 is arranged in the front side of the wiping unit 7 in the Y direction and the head carriage 42 moves to the purge unit 6 or the like after passing the wiping unit 7. However, the scraping unit 70 stops by abutting the purge unit 6. Since the connecting spring 77 which is a plate spring can be flexibly deformed, when the scraping unit 70 abuts the purge unit 6 and a strong force is applied thereto, the engaging unit 770 deforms and it comes out from the concave 426. In such way, the joint between the scraping unit 70 and the head carriage 42 is released. Here, it is preferred that the scraping unit 70 is provided with a spring or the like for returning to the initial position (in the embodiment, the position in the back than the wiping unit 7 in the Y direction) after the joint with the head carriage 42 is released.

Here, the method for making the scraping unit 70 be hooked to the drawing head 41 or the head carriage 42 holding the drawing head 41 to move the scraping unit 70 is not specifically limited and a configuration other than what is exemplified here may be used.

The control device 80 is set on a substrate or the like (not shown) which is disposed on the under surface or the like of the top board of the case 11, for example. Here, in the embodiment, as described above, the X direction moving stage 45, the head carriage 42 and the like are also provided with substrates, the substrates being dispersed, other than the main substrate which is disposed on the under surface of the top board of the case 11. By the substrates being electrically connected, each parts are integrally controlled and each parts can operate in liaison with each other.

FIG. 11 is a block diagram of a main part showing the control configuration according to the embodiment.

As shown in FIG. 11, the control device 80 is a computer including a controller 81 which is structured by including a CPU (Central Processing Unit) (not shown) and a storage 82 which is structured by including a ROM (Read Only Memory), a RAM (Random Access Memory) and the like (both not shown).

In the storage 82, various types of programs, various types of data and the like for operating the nail print device 1 is stored.

In particular, in the storage 82, various types of programs such as the maintenance program for performing the maintenance operation to perform maintenance of the drawing head 41, the nail information detection program for detecting various types of nail information of nail T such as shape of a nail, contour of a nail, width of a nail, area of a nail and the like in a nail image, a drawing data generation program for generating data for drawing, a drawing program for performing the drawing process, and the like are stored in the program storage region 820 structure by including a ROM and the like. By these programs being executed by the control device 80, individual parts of the nail print device 1 can be integrally controlled.

Further, in the embodiment, the storage 82 is provided with a maintenance mode storage region 821 in which data and the like relating to maintenance modes is stored, a nail design storage region 822 in which image data of a nail design which is to be drawn on the nail T is stored, a nail image storage region 823 in which a nail image of the nail T of the finger U1 of a user which is obtained by the imaging mechanism 50 is stored, a nail information storage region 824 in which nail information (the contour of the nail T and the inclination angle (curvature) and the like of the nail T) which is detected by the nail information detector 813 is stored, and the like.

When seen in terms of function, the controller 81 includes an imaging controller 811, a nail information detector 812, a drawing data generator 813, a processor 814, a display controller 815, and the like. Functions as these imaging controller 811, nail information detector 812, drawing data generator 813, processor 814, display controller 815 and the like are made in reality by the cooperation between the CPU of the controller 81 and the programs stored in the program storage region 820 of the storage 82.

Further, in the embodiment, the controller 81 is provided with a timer 816 and it can figure out various types of elapsed time period and the like.

The imaging controller 811 controls the imaging device 51 and the lighting devices 52 of the imaging unit 50 and makes the imaging device 51 photograph a finger image (nail image) including an image of the nail T of the finger U1 which is fixed to the finger fixation unit 3.

The image data of the nail image which is obtained by the imaging mechanism 50 is stored in the nail image storage region 821 of the storage 82.

The nail information detector 813 is a unit which detects nail information with respect to a nail T of a finger U1 on the basis of the image of the nail T of the finger U1 which is fixed to the finger fixation unit 3 which is photographed by the imaging device 51.

Here, the nail information is the contour of a nail T (nail shape, X-Y coordinate of the horizontal position of a nail T), the height of a nail T (the position of a nail T in the vertical direction, hereinafter, also referred to as "the vertical position of the nail T" or merely "the position of the nail T"), the curvature of a nail T, and the like, for example.

The nail information detected by the nail information detector 812 is stored in the nail information storage region 822 of the storage 82.

The drawing data generator 813 generates data for drawing which is to be performed on the nail T of the finger U1 by the drawing head 41 on the basis of the nail information detected by the nail information detector 812.

In particular, the drawing data generator 813 performs the fitting process where the image data of a nail design is enlarged, reduced, cut out, or the like so as to fit the shape of the nail T on the basis of the shape and the like of the nail T detected by the nail information detector 812.

Further, in the case where the curvature or the like of the nail T is obtained by the nail information detector 812, the drawing data generator 813 generates the data for drawing by which drawing is to be performed to the surface of the nail T which is the drawing target surface by correcting the curved surface as needed.

The processor 814 is a controller which outputs a control signal to the drawing mechanism 40 on the basis of the data for drawing which is generated by the drawing data generator 813 and which controls the X direction moving motor 46, the Y direction moving motor 48, the drawing head 41 and the like of the drawing mechanism 40 so as to perform drawing to the nail T in according to the data for drawing.

Further, in the embodiment, while the processor 814 moves the drawing head 41 from the stand-by area 22 to the drawing area 21, according to the predetermined maintenance mode, the processor 814 controls the drawing head 41 and the head moving unit 49 so that the maintenance operation is performed at least once with respect to at least one among the plurality of maintenance units (in the embodiment, the purge unit 6 and the wiping unit 7).

As for the maintenance modes of the embodiment, there are the first maintenance mode which performs a plurality of times of maintenance operation with one maintenance unit, the second maintenance mode which performs the maintenance operation once by each of all the maintenance units, the third maintenance mode which does not perform the maintenance operation of the wiping unit 7, and the fourth maintenance mode which does not perform the maintenance operation of the purge unit 6.

The second maintenance mode is the mode which is performed in the normal drawing operation. In contrary, the first maintenance mode is the mode which is selected when it is desired to reinforce the maintenance operation, for example. Further, the third maintenance mode is the mode which is selected when it is desired to promptly perform the drawing process, for example. The fourth maintenance mode is the mode which is selected when the remaining amount of ink in the drawing head 41 is low, for example.

Here, the detail content of each maintenance mode will be described later.

Further, by which of the maintenance mode the processor 814 performs the maintenance of the drawing head 41 is decided, that is, as for the factor to determine/set the content of the maintenance operation, for example, the total amount of the ink discharged from the ink discharge surface 411 of the drawing head 41 may be considered.

Among the total amount of ink, the amount of ink discharged by the drawing is figured out based on the data for drawing, based on which drawing was performed after the drawing head 41 was settled on.

Further, the amount of ink that is discharged in the purge process by the purge unit 6 is figured out by the processor 814 every time the purge process is performed.

The processor 814 figures out the discharged amount of ink due to drawing and the discharged amount of ink due to purge process as the total amount of ink and figures out (estimates) the remaining amount of ink in the drawing head 41 from the total amount of ink to determine/set the maintenance mode.

For example, in the case where the remaining amount of ink is lower than "a predetermined amount", the fourth maintenance mode in which maintenance does not require great ink discharge amount as in the purge process is selected by the processor 814.

Here, "a predetermined amount" which is the reference for determining that the remaining amount of ink is low is to be set to which level is set in an arbitrary manner. Further, the "predetermined amount" may be set/changed ex-post facto by the user. For example, in the case where the user selects the eco mode or the like so as to perform the operation while restricting the amount of ink used as much as possible, the "predetermined amount" is set to relatively high level so that even in the case where the remaining amount of ink is still sufficient, the maintenance mode where the purge process or the like is not performed (in the embodiment, the fourth maintenance mode) may be selected.

Moreover, as for the factor for the processor 814 to determine/set the maintenance mode, for example, the drawing elapsed time period which is the time elapsed since the drawing operation by the drawing head 41 was started may be considered.

The controller 81 of the embodiment is provided with the timer 816 as the drawing time obtaining unit which obtains the drawing elapsed time period which is the time elapsed since the drawing operation by the drawing head 41 was started, and the drawing elapsed time period is obtained by the timer 816.

The processor 814 may set the maintenance mode on the basis of the drawing elapsed time period which is obtained by the timer 816.

For example, in the case where the drawing elapsed time period is longer than a predetermined time period, the possibility that the ink clogging or the like has occurred is high. Therefore, the first maintenance mode is set to perform a thorough maintenance operation. On the other hand, in the case where the drawing operation was performed only for a short time period, the fourth maintenance mode could be selected so as to finish the maintenance only by a simple maintenance operation.

Here, which level of drawing time period is determined as being longer than a predetermined time period and which level of drawing time period is determined as being shorter than a predetermined time period is to be set in an arbitrary manner. In such case, the predetermined time period set as a default may be changed by the user.

Furthermore, the timer 816 of the embodiment functions as the resting time obtaining unit which obtains the resting elapsed time period since the last drawing operation has been performed by the drawing head 41.

The processor 814 may set the maintenance mode on the basis of the resting elapsed time period which is obtained by the timer 816.

For example, in the case where the resting elapsed time period is longer than a predetermined time period, the possibility that the ink is difficult to be discharged is high due to drying and clogging of the ink inside the nozzles and due to the increased viscosity in ink. Therefore, the first maintenance mode is set to perform a thorough maintenance operation. On the other hand, in the case where only a short time period has elapsed since the previous drawing, the fourth maintenance mode could be selected so as to finish the maintenance only by a simple maintenance operation.

Here, in such cases, which level of drawing time period is determined as being longer than a predetermined time period and which level of drawing time period is determined as being shorter than a predetermined time period is also to be set in an arbitrary manner. In such case, the predetermined time period set as a default may be changed by the user.

In addition, the operating unit 12 or the like of the nail print device 1 may be provided with a maintenance mode setting button or the like to perform the input operation of mode setting which is performed by the user. In such case, when the input operation of the mode setting is received by the controller 81, the processor 814 performs the maintenance operation in the maintenance mode whose setting is input.

The display controller 815 is a controller which controls the display 13 and makes the display 13 display various types of display screens. In the embodiment, the display controller 815 makes the display 13 display a screen to select a nail design, a thumbnail image for design confirmation, a nail image which is obtained by photographing a finger U1, an image which is obtained by projecting the original image onto a nail T, various types of instruction screens, operation screens and the like.

Next, the drawing method according to the embodiment will be described with reference to FIGS. 12 to 14.

Figure 12:
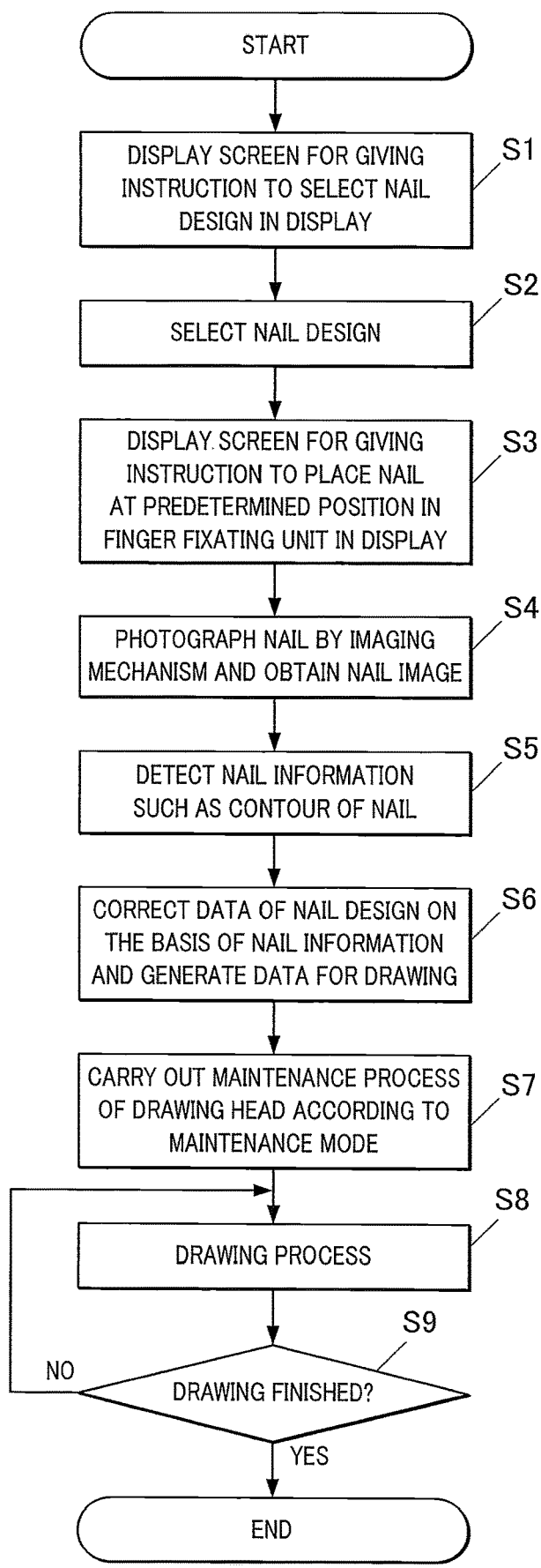
FIG. 12 is a flowchart showing the drawing process which is performed in the nail print device according to the embodiment.

In the case where nail printing is performed by the nail print device 1, as shown in FIG. 12, the display controller 815 first reads out nail designs from the nail design storage region 824 and makes the display 13 display a screen to ask the user to select a nail design (step S1). After the user selects any one of nail designs among the nail designs displayed in the display 13 by performing an input operation such as a touch operation or the like, the desired nail design is selected as the design to be drawn on the nail T (step S2).

Further, the display controller 817 makes the display 13 display an instruction screen which gives instruction to set the nail T which is the drawing target in the finger fixation unit 3 (step S3).

When the finger U1 is set in the finger fixation unit 34, the imaging controller 811 controls the imaging mechanism 50 so as to photograph the nail T and obtains a nail image (step S4). Then, the nail information detector 813 detects nail information such as the contour, the curvature and the like of the nail T in the nail image (step S5).

After the nail information is detected, the drawing data generator 813 reads in the data of the drawing image of the nail design which is selected by the user, corrects the data of the drawing image on the basis of the nail information detected with respect to the nail T, and generates the data for drawing (step S6). The data for drawing which is generated by the drawing data generator 813 is sent to the processor 814.

Before moving onto the drawing operation, the processor 814 determines the maintenance mode and performs the maintenance process in accordance with the maintenance mode (step S7).

Here, the maintenance process will be described in detail with reference to FIGS. 13 and 14.

Here, in FIG. 14, I to V indicate the moving paths of the drawing head 41.

First, in the case of a normal moving where the drawing head 41 is made to move to the drawing area 21 from the state where the drawing head 41 is in the stand-by area 22 and the drawing operation is performed, as shown in FIGS. 13B and 14B, the processor 814 adopts the second maintenance mode and starting from the state where the ink discharge surface 411 is capped by the cap 23 of the stand-by area 22 (step S21), the drawing head 41 is made to move to the left side in the X direction (the left side in FIG. 14B) and the wiping unit 7 wipes the ink discharge surface 411 (step S22). Next, the drawing head 41 is made to move to the front in the Y direction (the lower side in FIG. 14B) as it is and ink is forcefully discharged by the purge unit 6 (step S23). Thereafter, the drawing head 41 is made to move to the front in the Y direction, to the right side in the X direction so as to move to the position above the drawing region 21 (step S24).

In the case where the drawing elapsed time period is a predetermined time period or longer or the resting elapsed time period is a predetermined time period or longer, if the user has selected/set and the like the reinforced maintenance mode (the first maintenance mode) due to the discharging not being in a good condition in the actual trial drawing or the like, as shown in FIGS. 13A and 14A, the processor 814 adopts the first maintenance mode and starting from the state where the ink discharge surface 411 is capped by the cap 23 of the stand-by are 22 (step S11), the drawing head 41 is first made to move slightly to the front in the Y direction (the lower side in the FIG. 14A) and further is made to move to the left in the X direction (the left side in FIG. 14A) and ink is forcefully discharged by the purge unit 6 (step S12). Next, the drawing head 41 is once made to move slightly to the back in the Y direction (the upper side in FIG. 14A) and the wiping unit 7 wipes the ink discharge surface 411 (step S13). Next, the drawing head 41 is made to move in the front in the Y direction (the lower side in FIG. 14A) as it is and ink is forcefully discharged by the purge unit 6 again (step S14). Thereafter, the drawing head 41 is made to move to the front in the Y direction, to the right side in the X direction so as to move to the position above the drawing area 21 (step S15).

Next, if the user selects/sets and the like the simplified maintenance mode (the third maintenance mode) because he/she wants to promptly perform the drawing process or the like, as shown in FIGS. 13C and 14C, the processor 814 adopts the third maintenance mode and starting from the state where the ink discharge surface 411 is capped by the cap 23 of the stand-by area 22 (step S31), the drawing head 41 is first made to move slightly to the front in the Y direction (the lower side in FIG. 14C), and to the left side in the X direction (the left side in FIG. 14C) and ink is forcefully discharged by the purge unit 6 (step S32). Thereafter, the drawing head 41 is made to move to the front in the Y direction, to the right side in the X direction so as to move to the position above the drawing area 21 (step S33).

Further, in the case where the remaining amount of ink is a predetermined amount or lower or in the case where the user has selected/set the simplified maintenance mode (the fourth maintenance mode) due to a reason that he/she wants to keep the amount of ink to be used low, wants to promptly perform the drawing process or the like, as shown in FIGS. 13D and 14D, the processor 814 adopts the fourth maintenance mode and starting from the state where the ink discharge surface 411 is capped by the cap 23 of the stand-by area 22 (step S41), the drawing head 41 is made to move to the left in the X direction (the left side in FIG. 14D) and the wiping unit 7 wipes the ink discharge surface 411 (step S42).

Thereafter, the drawing head 41 is made to move to the front in the Y direction and to the right in the X direction so as to move to the position above the drawing area 21 (step S43).

Here, if what was determined by the processor 814 and the content of the input setting performed by the user differ, the input content of the user may be prioritized. Moreover, the display screen and the like indicating the current status of the drawing head 41 (the remaining amount of ink is low, the resting elapsed time period is long and a thorough maintenance is needed and the like) may be displayed in the display or the like to ask the user which maintenance mode he/she chooses.

Returning to FIG. 12, when the drawing head 41 moves to the position above the drawing area 21, the processor 814 outputs the data for drawing to the drawing mechanism 40 to start the drawing process (step S8).

The processor 814 determines whether the drawing process has ended (step S9). If the drawing process has not ended (step S9; NO), the processor 814 returns to step S8 and continues the drawing process.

On the other hand, if the drawing of a nail design to the nail T has ended (step S9; YES), the drawing process according to the embodiment ends.

After the drawing process has ended, information regarding the ending of the drawing process may be displayed in the display 13 or the like.

After the drawing process has ended, the user removes the finger U1 from the device and performs the after process such as drying of the drawing mechanism, applying the overcoat material and the like.

Here, although it is not specifically described above, in the case where the drawing is to be performed to the nail T by the nail print device 1 of the embodiment, it is preferred that the finger U1 and the nail T thereof is fixed to the finger fixation unit 3 after the user performing the pre-process of applying the undercoat material of white color or the like to the nail region and drying the undercoat material. In such way, by applying the undercoat to the nail T in advance, the color of the ink discharged on the nail T comes out brighter and the outcome will be more beautiful. Further, in the case where the undercoat material of white color or the like is applied to the nail T, the border between the nail T and the skin section of the finger U1 and the like can be easily recognized by the nail information detector 812 and the contour of the nail T which is the drawing target can be detected in a greater resolution.

As described above, according to the embodiment, the drawing area 21 and the stand-by area 22 are provided so as to be in different positions from each other on the X-Y plane surface and within the range where the drawing head 41 can be made to move by the head moving unit 49, a plurality of maintenance units are arranged at positions different from each other in the drawing area and the stand-by area on the X-Y plane surface and within the range where the drawing head 41 can be made to move by the head moving unit 49, the plurality of maintenance units are arranged so as to be in different positions from each other at least in the X direction or in the Y direction, the processor 814 controls the drawing head 41 and the head moving unit 49 so that the maintenance operation will be performed at least once in at least one of the plurality of maintenance units according to a predetermined maintenance mode while the drawing head 41 is made to move to the drawing area 21 from the stand-by area 22.

In the case of a commonly used drawing device which performs drawing on a sheet of paper, since the drawing operation is performed while conveying the sheet of paper which is the drawing target in a predetermined conveyance direction (for example, the Y direction in FIG. 3), the drawing head 41 has a uniaxial structure where the drawing head 41 only moves in the direction orthogonal to the conveyance direction (for example, the X direction in FIG. 3 and the like).

In contrary, as in the embodiment, in the case where the drawing head 41 has a bi-axial structure where it can move in both X direction and Y direction, the drawing head 41 can be arranged in any position as needed regardless of where the drawing area, the stand-by area and the area where maintenance takes place are arranged as long as they are arranged on the X-Y plane surface where the drawing head 41 can be made to move by the draw moving unit 49.

Therefore, the degree of freedom with respect to the arrangement and design of the inside of the device increase. Further, in the case where a plurality of maintenance units, such as the purge unit 6 and the wiping unit 7, are provided as in the embodiment, they can be arranged by being dispersed freely and they can be efficiently arranged so that the drawing head 41 only needs to be moved the minimum amount.

Further, in the case where a plurality of maintenance units are provided, they can be arranged by being dispersed. Therefore, the maintenance units where the drawing head 41 make stops for maintenance operations, the combination thereof and the like can be decided freely according to the status and the like of the drawing head 41. Therefore, by arbitrarily combining the needed maintenance operations according to the situation and executing them, the maintenance of the drawing head 41 can be performed efficiently.

In such way, the malfunction such as the discharge malfunction can be sufficiently resolved. Further, a flexible maintenance according to various types of situations and requests such as prioritizing the prompt drawing process by omitting a part of the maintenance operations, reducing the amount of ink used by omitting the maintenance operation where a great amount of ink is discharged such as in the purge process, and the like can be realized.

Further, by being able to omit unnecessary maintenance operation in such way, the level of wearing out of the wearing-out parts such as the wiping members 71 of the wiping unit 7, the absorbing body 63 of the purge unit 6, and the like can be kept down.

Further, in the embodiment, the stand-by area 22 is provided with the cap 23 for covering the ink discharge surface 411.

Thereby, the ink discharge surface 411 can be prevented from drying during the time where drawing does not take place and the state where the drawing operation can be performed anytime immediately can be maintained. Further, even if the device will not be used for a long period of time, the device can be stored while maintaining the ink discharge surface 411 in good condition suited for drawing.

Moreover, in the embodiment, the plurality of maintenance units includes the purge unit 6 which receives the ink which is forcefully discharged from the ink discharge surface 411 and the wiping unit 7 which cleans the ink discharge surface 411 by wiping.

By performing the maintenance operations of the purge unit 6 and the wiping unit 7, the ink attached to the ink discharge surface 411 and the ink discharge outputs formed on the ink discharge surface 411 and the air, foreign matters and the like in the nozzles can be removed appropriately, and the good discharging state can be recovered.

Further, in the embodiment, with respect to a predetermined maintenance mode, the content of the maintenance operation is set on the basis of the total amount of ink which is discharged from the ink discharge surface of the drawing head.

In such way, in the case where the remaining amount of ink is low, the maintenance operation where a great amount of ink is used such as in the purge process or the like can be avoided and the drawing head 41 can be made to last long.

Furthermore, in the embodiment, the timer 816 as the drawing time obtaining unit which obtains the drawing elapsed time period since the drawing operation by the drawing head has started is included, and with respect to a predetermined maintenance mode, the content of the maintenance operation is set on the basis of the drawing elapsed time period which is obtained by the timer 816.

Therefore, in the case where it is expected that the ink discharge surface is not clean such as after performing drawing for a long period of time, a normal ink discharge can be realized due to appropriate handling such as selecting the mode (for example, the first maintenance mode) which can perform a thorough maintenance or the like.

Further, in the embodiment, the timer 816 as the resting time obtaining unit which obtains the resting elapsed time period since the last drawing operation by the drawing head was performed is included, and with respect to a predetermined maintenance mode, the content of the maintenance operation is set on the basis of the resting elapsed time period obtained by the timer 816.

Therefore, if there is a possibility that the ink and foreign matters attached to the ink discharge surface has hardened and the ink inside the nozzles has increased its viscosity such as in the case where the device has been left not used for a long period of time, for example, a normal ink discharge can be realized due to appropriate handling such as selecting the mode (for example, the first maintenance mode) which can perform a thorough maintenance or the like.

Here, although the embodiment of the present invention is described as above, the present invention is not limited to the embodiment as described above and it is needless to say that various types of modifications can be performed within the scope of the invention.

For example, in the embodiment, an example where a unit which forcefully discharges the ink in the operation similar to the normal ink discharging is shown as the purge unit 6 is described. However, the purge unit 6 is not limited to such configuration.

For example, a purge unit which includes a small-size pump and which absorbs the ink, foreign matters and the like remaining in the nozzles with the pump while making the ink discharge surface 411 be in the closed state to forcefully discharge the ink, foreign matter and the like outside may be provided.

Further, in the embodiment, the case where the purge unit 6 and the wiping unit 7 are included as the maintenance units is shown as an example. However, the maintenance units are not limited to these types. Instead of the purge unit 6 and the wiping unit 7 or in addition to them, other maintenance units may be provided.

As for the other maintenance units, for example, a unit which sucks up and absorbs the ink and the like attached to the ink discharge surface 411 to remove them by pushing an absorbing member formed of a high absorbing material such as felt against the ink discharge surface 411 may be provided.

Furthermore, in the embodiment, the configuration where one purge unit 6 and one wiping unit 7 are included is shown as an example. However, the number of purge unit 6 and the number of wiping unit 7 to be included are not specifically limited. For example, one type of maintenance unit may be provided at a plurality of positions such as the purge units 6 may be respectively disposed near the stand-by area 22 and near the drawing area and also, the wiping units 7 may be respectively disposed in the back and front of the purge unit 6 or on both sides of the purge unit 6, and the like.

Moreover, in the embodiment, as the determining factors when the maintenance mode is to be selected, the remaining amount of ink, the drawing elapsed time period, the resting elapsed time period and the like are suggested as examples. However, the determining factors are not limited to these factors, and other factors may be taken into consideration.

Further, when selecting a maintenance mode, the determination may be made by taking a plurality of factors into consideration. In such case, if there are conditions that contradict after performing a certain weighing to the determination factors, the maintenance mode according to which high weighing was performed may be selected.

Further, in the embodiment, the case where the storage unit 82 of the nail print device 1 is provided with the nail design storage region 822 in which image data of nail designs are to be stored is shown as an example. However, the present invention is not limited to the case where image data of nail designs are stored in the storage unit 82 of the nail print device 1.

For example, image data of nail designs may be stored in a server device which can be connected via the network circuit or the like and the image data of nail designs may be referred to by accessing the server device or the like.

In such way, the design to be drawn can be selected from greater selection of nail designs.

Furthermore, in the embodiment, the inkjet type drawing head 41 is included as the drawing head 41 of the nail print device (drawing device) 1. However, the configuration of the drawing head 41 is not limited to such configuration.

For example, a pen holder which holds a pen for drawing which performs drawing by making the pen tip come in contact with the surface of the nail T may be included and the drawing may be performed by the pen. Further, both the ink jet type drawing head such as in the embodiment and the pen holder which holds a pen for drawing may be included and the drawing may be performed by using a plurality of drawing units.

Moreover, the nail print device 1 may be provided with a drying unit including a heater and a fan for drying the ink after the drawing.

Further, in the embodiment, the case where the photographing and drawing processes are performed by fixating the nail T of the finger U1 to the finger fixation unit 3 is shown as an example. However, the target to which drawing can be performed in the nail print device (drawing device) 1 is not limited to the nail T of the finger U1.

For example, even an object in a nail-like shape such as a nail chip which is used by attaching it to the nail T may be the "nail" to which drawing can be performed in the system.

Although a number of embodiments according to the present invention are described above, the scope of the present invention is not limited to the above described embodiments and includes the scope described in the claims and the equivalents thereof.

What is claimed is:

1. A drawing device, comprising:
   a drawing head which performs drawing on a drawing target;
   a head mover which moves the drawing head in a first direction and in a second direction which intersects with the first direction;
   a cap which protects the drawing head; and
   a processor which controls the drawing head and the head mover;
   wherein a drawing area where the drawing target is placed and the drawing by the drawing head is performed and a stand-by area where the cap is disposed are provided within a range where the drawing head is moved by the head mover, and
   wherein when the drawing head performs the drawing on the drawing target the processor controls the head mover to move the drawing head along the first direction into the drawing area, and the drawing head is protected with the cap by the processor controlling the head mover to move the drawing head into the stand-by area along the second direction.

2. The drawing device of claim 1, wherein, by the processor controlling the head mover to move the drawing head into the stand-by area along the second direction, the cap is pushed along the second direction and raised to a position where the cap protects the drawing head.

3. The drawing device of claim 2, wherein:
   the drawing head has an ink discharge surface from which an ink is discharged to the drawing target, and
   by the processor controlling the head mover to move the drawing head to the stand-by area along the second direction, the cap is pushed along the second direction and raised to a position where the cap covers the ink discharge surface of the drawing head.

4. The drawing device of claim 1, wherein the cap includes a biaser which has a bias force biasing the cap in the second direction.

5. The drawing device of claim 4, wherein, by the processor controlling the drawing head to move into the stand-by area along the second direction, the cap is pushed along the second direction against the bias force and raised to a position where the cap protects the drawing head.

6. The drawing device of claim 5, wherein:
   the drawing head has an ink discharge surface from which an ink is discharged to the drawing target, and
   by the processor controlling the drawing head to move into the stand-by area along the second direction, the cap is pushed along the second direction against the bias force and raised to a position where the cap covers the ink discharge surface of the drawing head.

7. The drawing device of claim 1, wherein the drawing head is disposed in the stand-by area during a non-drawing time when the drawing head does not perform the drawing.

8. The drawing device of claim 1, wherein the stand-by area is than spaced apart from the drawing area along the second direction.

9. The drawing device of claim 1, wherein the drawing head is moved to the stand-by area by the processor controlling the head mover to move the drawing head along the first direction and then controlling the head mover to move the drawing head into the stand-by area along the second direction.

10. The drawing device of claim 1, wherein, when the drawing head performs the drawing on the drawing target, the cap is disposed at a position lower than the drawing head, the position being a position where the cap does not come in contact with the drawing head.

11. The drawing device of claim 1, wherein:
    the drawing head has an ink discharge surface from which an ink is discharged to the drawing target, and
    the cap protects the ink discharge surface of the drawing head.

12. A control method of a drawing device, the drawing device including: a drawing head which is moved in a first direction and in a second direction that intersects with the first direction and which performs drawing on a drawing target; and a cap which protects the drawing head, wherein a drawing area where the drawing target is placed and the drawing by the drawing head is performed and a stand-by area where the cap is disposed are provided within a range where the drawing head is moved, the method comprising:

when causing the drawing head to perform the drawing on the drawing target, moving the drawing head along the first direction into the drawing area; and protecting the drawing head with the cap by moving the drawing head into the stand-by area along the second direction.

13. A non-transitory storage medium storing a program executable by a computer which controls a drawing device, the drawing device including: a drawing head which is moved in a first direction and in a second direction that intersects with the first direction and which performs drawing on a drawing target; and a cap which protects the drawing head, wherein a drawing area where the drawing target is placed and the drawing by the drawing head is performed and a stand-by area where the cap is disposed are provided within a range where the drawing head is moved, the program being executable by the computer to control the drawing device to perform processes comprising:

when causing the drawing head to perform the drawing on the drawing target, moving the drawing head is moved along the first direction into the drawing area; and protecting the drawing head with the cap by moving the drawing head into the stand-by area along the second direction.

* * * * *